Nov. 2, 1971   D. O. FOREMAN   3,616,748
BARBECUING APPARATUS
Filed Oct. 25, 1968
FIG. 1
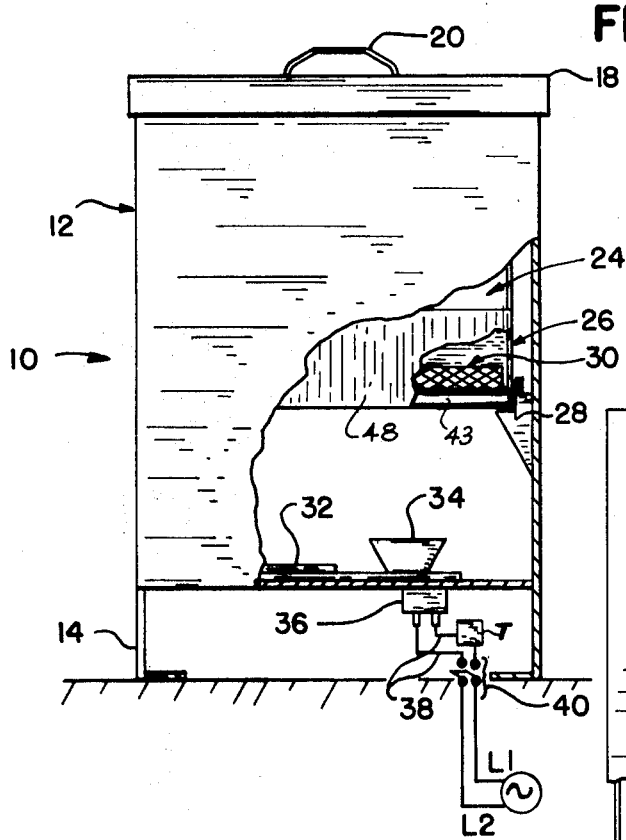
FIG. 2
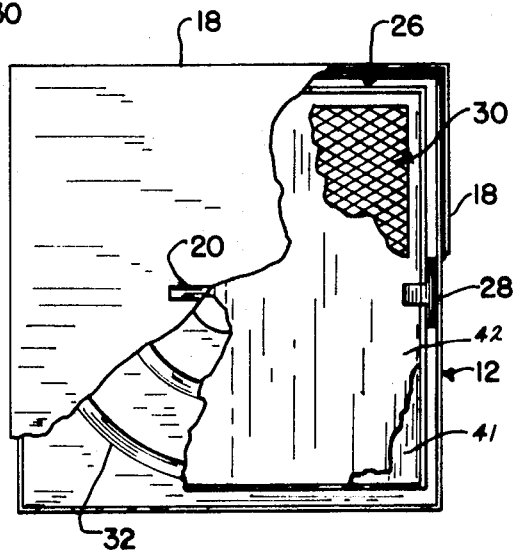
FIG. 4
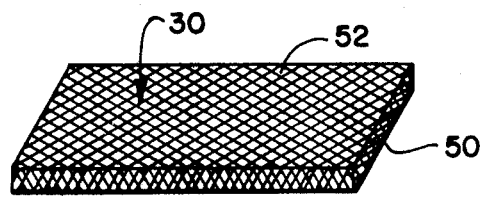
FIG. 3
FIG. 5
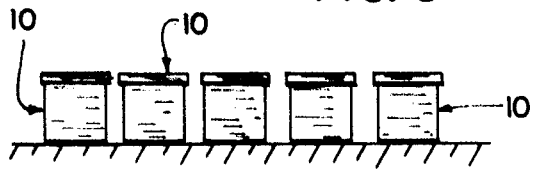
INVENTOR.
Dane O. Foreman
By Marcus L Bates

United States Patent Office 3,616,748
Patented Nov. 2, 1971

3,616,748
BARBECUING APPARATUS
Dave O. Foreman, 606 E. Broadway,
Andrews, Tex. 79714
Filed Oct. 25, 1968, Ser. No. 770,757
Int. Cl. A47j 43/18
U.S. Cl. 99—450
5 Claims

ABSTRACT OF THE DISCLOSURE

A barbecue apparatus which includes an enclosure supported by legs with a heating element located in the bottom of the enclosure and a lid telescopingly received at the top. A removable food chamber is supported clear of the walls and provided with a grill means which is spaced apart from the bottom of the food chamber. The bottom of the food chamber is in the form of a dead air space. Food, when placed on the grill, may be completely and uniformly cooked without further disturbance and in a minimum amount of time.

BACKGROUND OF THE INVENTION

Outdoor cooking has achieved great popularity, especially in the surburbs, and many ingenious stove structures are available from the prior art which offer a means by which the individual can barbecue food such as steak, hamburger patties, hot link sausages, and the like. The designers of the barbecue structures have strived to produce devices which are economical in manufacture, simple in construction, easy to manipulate, and which enables the amateur to produce a palatable barbecue. Many connoisseurs of barbecued meat products do not particularly enjoy manipulating their own barbecue device because it is time consuming, requires a considerable amount of skill if the delicious flavor and aroma is to be properly imparted into the meat products, and uncontrollable factors of weather, sand storms, unpleasing environmental conditions must be faced. Furthermore, the original investment in barbecue equipment is a deterrent to many who would otherwise engage in this endeavor. Therefore, it is advantageous for one to be able to purchase completely cooked barbecued meat products from various convenient sources such as the local grocery store.

In order for delicatessens, local grocery stores, meat markets, and the like to provide barbecue products, it has heretofore been necessary for the meat product to be prepared well in advance of the anticipated sale because several hours are generally required to properly barbecue chickens, roast, or steaks. Furthermore, the meat product must be manipulated while it is being cooked so as to avoid overcooking some areas and in order to impart a uniform appearance thereto. After the barbecuing apparatus has been charged with the meat product, it is generally several hours before an additional "batch" of barbecue products can be prepared. This batch process together with the extensive time element involved often causes the operator of the barbecuing device to either run completely out of barbecued food or else be left with surplus cooked products in the evening.

SUMMARY OF THE INVENTION

This invention relates to a barbecue apparatus comprised of an enclosure defined by a bottom, side walls, and a telescoping top. The apparatus is bottom supported on legs and the top is telescopingly received at the upper extremity thereof. A food chamber is removably received within, and spaced apart from, the side walls of the enclosure. The food chamber has a grill enclosed therewith which supports the food product to be barbecued. The bottom of the food chamber is provided with a dead air space. An electrical heating element is disposed within the bottom of the enclosure and a timing device determines the time to which the meat product is exposed to the elevated temperature of the device. The particular design of the apparatus enables meat to be properly barbecued within a greatly reduced length of time as compared to prior art devices.

It is among the objects of the present invention to provide a simple, improved barbecue apparatus having a grill and food chamber disposed therein in a manner which improves the circulation and transfer of heat with respect to the meat product and which completely barbecues the product in a minimum of time.

Another object of the present invention is to provide an improved food chamber having a grill for holding barbecue and which cooperates with a heat source in an improved manner.

Still another object of the present invention is the provision of a barbecuing apparatus which is totally enclosed and which cooks the food product in a greatly reduced amount of time as compared to other similar apparatus.

A further object of the present invention is the provision of a combination barbecue apparatus having a food receiving chamber therein which cooperates with a heat source in a manner to provide fully cooked meat products in a short time without the necessity of manipulating the product during the cooking thereof.

A still further object of the present invention is the provision of means by which food products can be imparted with heat and smoke in an improved manner.

These and other objects of the present invention will become apparent from a consideration of the following remainder of the instant disclosure.

The above objects are attained in accordance with the present invention by the provision of an improved barbecuing apparatus fabricated substantially in accordance with the above abstract and summary.

BRIEF DESCRIPTION OF THE DRAWINGS

FIG. 1 is an elevational view of the present invention with some parts thereof being removed so as to disclose the interior thereof and some of the other remaining parts being shown in section;

FIG. 2 is a top plan view of the present invention with some parts thereof being cut away and removed and some of the remaining parts being shown in section;

FIG. 3 is a slightly enlarged elevational view of part of the apparatus seen in FIGS. 1 and 2, with some parts thereof being cut away and other parts being shown in section;

FIG. 4 is an enlarged perspective view of the grill previously shown in the foregoing figures; and FIG. 5 is a reduced diagrammatic representation showing several of the devices illustrated in FIG. 1.

DETAILED DESCRIPTION OF THE PREFERRED EMBODIMENT

The details of FIG. 1, in conjunction with the remaining figures, illustrates a single barbecuing pot, or unit 10, made in accordance with the present invention. The pot includes a main enclosure 12 formed by a single sheet of stainless steel bent into the form of an upwardly opening rectangular box which is provided with a bottom. The enclosure is suitably disposed above a supporting surface by means of downwardly depending legs 14 which may be an extension of two of the opposite side walls. A telescoping lid 18 is removably received at the upper extremity of the enclosure and is provided with handle 20 for convenience.

Suitably disposed within the main enclosure is a food chamber 26 having an upwardly directed opening 24 into which the product to be cooked is placed. A removable food supporting grill 30 is received within the food chamber. The food chamber is removably supported by brackets 28 attached to each of the vertical side walls of the main enclosure. An electrical heating element 32 is supported in close proximity to the bottom of the main enclosure and provides the heat source for the barbecuing apparatus. A stainless steel cup 34 is charged with oak, hickory, mesquite chips, or other suitable smoke producing means, and placed upon the heating element. Electrical connector 36 having insulated conductors 38 attached thereto includes a timing device T interposed in one of the legs of the indicated source of current. A double pole double throw switch 40 controls the flow of current to the heating element and timer.

As seen in FIG. 3 in conjunction with the remaining figures, the before mentioned food chamber which houses the removable grill includes lower and upper plate members 41, 42, respectively, which define a dead air space 43 exactly one half inch in thickness, and which forms the bottom of the food chamber. The upper plate member of the dead air space supports the before mentioned grill assembly. The food chamber further includes two upwardly extending arms 44 which receive multiple 90° bends at the terminal end thereof to form a handle 46. Side walls 48 are preferably turned up portions of the bottom plate member 41. That is, the side walls and bottom plate member are made from a common sheet of stainless steel material while the upper plate member is a separate sheet of material attached to the food enclosure by any suitable means.

Grill 30 of FIG. 4 (in conjunction with the foregoing figures), is seen to be fabricated from expanded stainless steel metal. The grill includes turned down edge portions 50 which presents a flat supporting surface 52 extending exactly three-fourths inch above the upper plate member 42.

The multiplicity of pots or units illustrated in FIG. 5 may be placed adjacent one another so as to provide sufficient units to accommodate any desired predetermined amount of barbecue. It is preferred to employ five units in each bank with each individual unit being separately operated in accordance with the illustrated circuitry of FIG. 1.

OPERATION

In operation, and with the unit in stand-by condition but devoid of food, the lid 18 is lifted from the main enclosure after which the handles 46 of the food chamber are grasped in each hand and the chamber removed from the main enclosure. Two pan ready chickens (hereinafter called birds), each weighing from two to three and one-half pounds, are preferably basted with a very light brush coat of barbecue sauce comprised of any good liquid shortening, and lightly sprinkled with paprika in order to impart the cooked bird with a golden brown hue. This initial basting is the only preparation required for the reason that the entire cooking process is achieved through a high speed cooking method which prevents dehydration of the bird.

The basted birds are placed within the food chamber on surface 52 of the grill with the lower extremity of the bird laying exactly three-fourths inch above the upper plate member 42. Stainless steel cup 34 is charged with a handfull of oak chips (although hickory or mesquite is sometimes preferred) and placed in the position illustrated in FIG. 1. The food chamber along with the grill and birds is replaced upon brackets 28 as illustrated in FIGS. 1 and 2. Lid 18 is telescopingly fitted onto the main enclosure, the timer T set for forty to fifty minutes, depending upon the weight of the birds, and switch 40 is closed. As the heating element brings the enclosure up to temperature, the birds rapidly reach the optimum barbecuing temperature. Radiant energy from the heating element impinges upon the inside peripheral wall surface of the main enclosure as well as upon the lower plate member of the food chamber. Convection heating occurs as a circulation pattern which may be traced between the outer wall of the food chamber and the inner wall of the main enclosure. A convective heat current flow path also occurs within the grill enclosure and under the grill 30. The bird temperature rapidly reaches equilibrium and at the end of the preselected time, the timer automatically discontinues flow of current through electrical conductors L1 and L2. During this time, while the bird is being cooked, it is unnecessary to tamper with or manipulate the bird in any manner because the dead air space causes the entire outer surface area of the bird to be exposed to a uniform or identical temperature.

Since the outer wall surface of the pot is uninsulated, the cool-down time is approximately equivalent to the heat-up time. The rapid cool-down time enables the telescoping lid 18 to be removed within a few minutes, whereupon the barbecued bird can be removed from the main enclosure by grasping each of the handles 46 and lifting the birds along with the grill and the food chamber from the main enclosure. Another batch of birds can now be charged into the unit by following the previous barbecue cycle of operation.

While the bird is cooking, the juices are caught on upper plate member 42 and vaporized. The entire main enclosure is filled with a steam-like atmosphere which intermingles with the wood smoke. The steam condenses at the upper extremity of the pot and is revaporized prior to reaching the heating element. The grill enclosure prevents fats and other liquids cooked from the bird from contacting the heating element. This is a desirable attribute of the invention because it prevents combustion of substance cooked from the bird. It is fairly well accepted that when meat drippings contact a heat source and are burned or combusted, the chemical composition can be changed into a cancerous forming product which is redeposited upon the food product and when eaten is thought to be detrimental to one's health. The continuous reflux action of the meat juices enhances conductivity of the heat from the heating element into the bird. This action not only reduces the cooking time to forty or fifty minutes, but additionally imparts a tenderizing effect upon the bird.

The time required for cooking is proportional to the weight of the bird and should be set as follows:

two to two and one-fourth pounds—forty minutes
two and one-fourth to two and three-fourths pounds—forty-five minutes
two and three-fourths to three and one-fourth pounds—fifty minutes.

The dead air space along with the heat circulation pattern prevents the bottom of the meat product from burning. The circulation pattern imparts an even distribution of heat about the entire contents of the food chamber. The one-half inch thickness of the air space is the result of many experiments.

When cooked in accordance with the present invention, the barbecued meat retains a large percentage of the juices and is imparted with a true smoked taste due to the comingling of the vapors from the wood chips with the juices and barbecue sauce.

One the food product has been placed into the cooking chamber, absolutely no attention is required by the operator since the entire barbecuing process is carried out automatically by the timer. The even distribution of heat over the entire food product is achieved as outlined above.

When it is desired to cook hot link sausages, German sausages, or other delicacies of this nature, the timer is set for eightteen minutes for a four to six pound load and the above procedure followed. The sausage is endowed with the same desirable attributes as outlined above.

While I have shown and described a main enclosure and a removable grill enclosure of a square configuration, it is also contemplated to fabricate these components into a circular configuration as well as an oval configuration. For optimum results I have found that it is desirable to utilize a main enclosure twelve inches in usable height, ten inches in width and depth, with the bottom plate 42 being suspended five inches above the heating element and one-half inch below the upper plate member, thereby leaving seven inches between the support brackets and the upper extremity of the main enclosure. The top surface of the grill 52 is preferably maintained exactly three-fourths inch above plate member 42. For this specified size pot, a heating element of 2,050 watts connected to a 220 volt source and fused with 15 amp fuses provide an ample heat source for a forty to fifty minute heating cycle.

As pointed out above, it is preferred to leave the enclosure uninsulated because of the beneficial rapid cool-down period as well as maintaining the upper portion of the pot at a temperature to bring about considerable condensation of the vapors which are cooked from the bird. The cost involved in a comparison between an insulated and uninsulated pot is on the order of a few cents which is negligible in view of the advantages obtained by the uninsulated pot.

I claim:

1. A barbecue apparatus having means forming an enclosure defined by a bottom wall, side walls, and with said side walls being upwardly directed to define an upwardly opening top;

means forming a source of heat within said enclosure;

a food chamber adapted to be received within said enclosure;

means located intermediate said top and bottom for removably supporting said food chamber in spaced apart relationship with respect to said bottom wall, said side walls, and said top;

said food chamber being defined by side walls, an upper plate member, a lower plate member, with said upper and lower plate members being spaced apart from one another and with the outer edge portion of each said upper and lower plate members being attached to said side walls of said food chamber to thereby define a dead air space therebetween; said upper plate member cooperating with the last said side walls to form an upwardly directed opening into which a product to be cooked is placed; and a grill adapted to be received within said food chamber and spaced apart from said upper plate member for supporting food placed thereon.

2. The barbecue apparatus of claim 1, wherein said grill is fabricated from a sheet of expanded metal;

said grill being defined by a peripheral edge portion comprised of the marginal edge portion of the expanded metal being vertically disposed in a downward direction to thereby form a support which maintains the grill surface disposed in spaced apart relationship with respect to the bottom of the food chamber.

3. The barbecue apparatus of claim 1 and further including means forming a telescoping top member adapted to be telscopingly received at the upper extremity of the main enclosure.

4. The barbecue apparatus of claim 1 and further including a telescoping top member adapted to slidably engage the upper extremity of the main enclosure;

said bottom of said food chamber being disposed at the lower extremity of said side walls of said food chamber to thereby leave an upwardly opening food charging area; and said grill being comprised of expanded metal and in the form of an inverted basket.

5. The apparatus of claim 1 wherein said upper and lower plate members are spaced one-half inch apart.

References Cited

UNITED STATES PATENTS

| 1,433,845 | 10/1922 | Prettyman | 126—9 |
| 1,837,924 | 12/1931 | Rutherford | 99—260 |
| 1,901,616 | 3/1933 | Vaughan | 99—325 UX |
| 2,221,098 | 11/1940 | Langsman | 126—30 UX |
| 2,597,477 | 5/1952 | Haislip | 126—9 X |
| 2,842,043 | 7/1958 | Reuland | 99—259 |
| 3,273,488 | 9/1966 | Anetsberger | 99—327 X |
| 3,333,526 | 8/1967 | Kirkpatrick | 99—260 |

WALTER A. SCHEEL, Primary Examiner

A. O. HENDERSON, Assistant Examiner

U.S. Cl. X.R.

99—259, 447